C. S. TALBERT.
TREE SUPPORT.
APPLICATION FILED JAN. 20, 1917.
1,234,960.
Patented July 31, 1917.
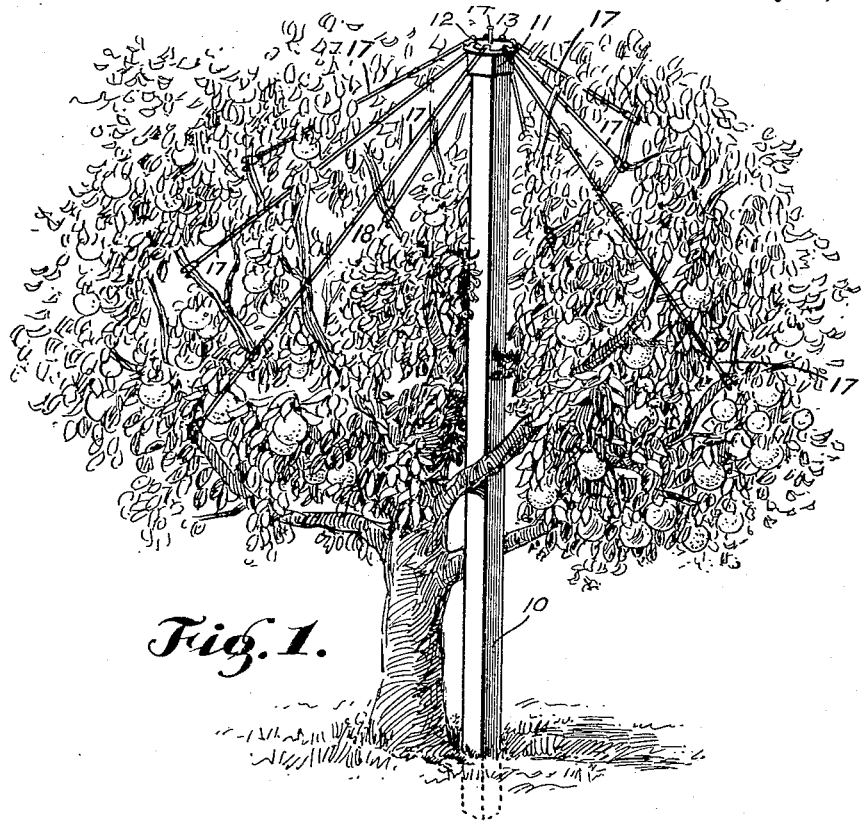
Fig. 1.
Fig. 2.
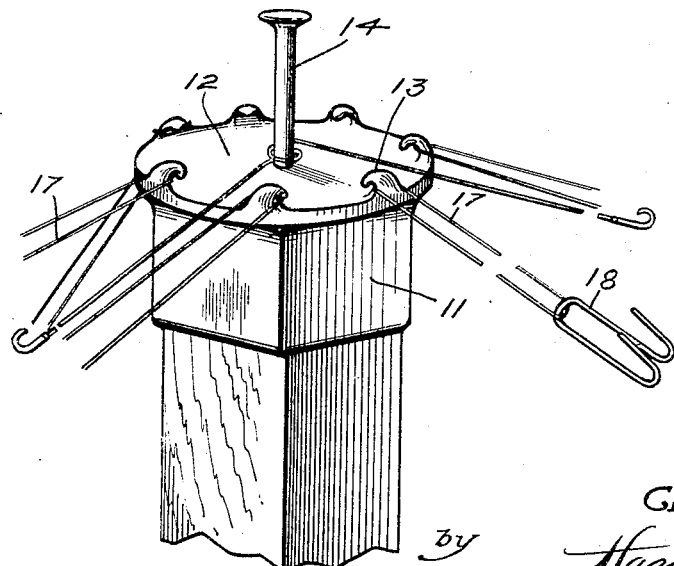
INVENTOR
Charles S. Talbert
by Hazard & Miller
ATTYS

UNITED STATES PATENT OFFICE.

CHARLES S. TALBERT, OF ANAHEIM, CALIFORNIA.

TREE-SUPPORT.

1,234,960.  Specification of Letters Patent.  Patented July 31, 1917.

Application filed January 20, 1917. Serial No. 143,511.

*To all whom it may concern:*

Be it known that I, CHARLES S. TALBERT, a citizen of the United States, residing at Anaheim, in the county of Orange and State of California, have invented new and useful Improvements in Tree-Supports, of which the following is a specification.

This invention relates to a support for trees and particularly pertains to supporting means for the limbs of fruit trees.

It often happens that the limbs of fruit trees become heavily loaded with fruit and are weighted down in such a manner as to be a detriment to the tree. It is the principal object of this invention to provide supporting means which will individually support each of the loaded limbs and will at the same time permit free passage beneath the tree without obstruction.

Another object of this invention is to provide a support for fruit trees which requires the use of but a single pedestal or supporting standard from which the various boughs of the tree may be supported and drawn toward the tree trunk in a manner to maintain them in their natural positions in relation to the body of the tree.

Another object of this invention is to provide a support which utilizes supporting members of simple construction adapted to be readily connected to the main support and the limbs supported thereby.

It is a further object of this invention to provide a tree support which is simple in its construction, is composed of parts inexpensive in manufacture and which may be produced in a cheap and rapid manner.

Other objects will appear hereinafter.

The invention is illustrated, by way of example, in the accompanying drawings in which:

Figure 1 is a view in perspective illustrating a fruit tree as provided with the support with which the present invention is concerned.

Fig. 2 is a view in perspective illustrating the upper end of the supporting standard and the manner in which the individual supporting members are detachably secured thereto.

Referring more particularly to the drawings, 10 indicates a standard or post which is here shown as square and adapted to extend upwardly along the side of a tree trunk. This post may be planted within the ground or may rest directly upon the ground as may be desired. The upper end of the post is preferably provided with a cast metal cap 11 which has a socket within which the post fits. The upper end of the cap is formed with an enlarged circular flange 12 to which are cast hooks 13. An opening is formed through the end of the cap for the reception of a nail 14 which passes down into the cap and tends to prevent the removal thereof.

When this support is used it is positioned vertically along the side of the tree trunk. Individual supporting wires 17 are then hooked over the hooks 13. These wires are formed of a double strand suitable gage wire which is passed through a wire hook 18 at its outer end. The supporting wires are formed of a desired length and the hook 18 is thereafter placed around a bough of the tree in a manner to raise it to its normal position and support it and its fruit. These supporting wires may radiate in all directions from the supporting positions and will therefore hold it in an upright position even though it has not been planted in the ground. In case other supporting wires than those connected with the hooks are to be used, they may be wrapped around the nail 14 and connected with hooks 18, as previously described.

It will thus be seen that the tree support here provided is simple in its construction, inexpensive in manufacture and may be readily placed in a supporting position in relation to a tree.

While I have shown the preferred construction of my tree support as now known to me, it is evident that various changes in the combination, construction and arrangement of parts may be made by those skilled in the art without departing from the spirit of my invention.

I claim:

A tree support, comprising a central post adapted to extend upwardly along the side of a tree trunk, a cap positioned over the upper end of said post, a series of hooks formed integral upon said cap and projecting upwardly, a series of limb supporting wires adapted to be detachably secured over said hooks, and hook members on the ends of said wires whereby the branches of the tree will be engaged and supported.

In testimony whereof I have signed my name to this specification.

CHARLES S. TALBERT.

Copies of this patent may be obtained for five cents each, by addressing the "Commissioner of Patents, Washington, D. C."